US00RE35556E

United States Patent [19]

Weinreich

[11] E Patent Number: Re. 35,556

[45] Reissued Date of Patent: Jul. 8, 1997

[54] TELEPORTER

[75] Inventor: Stephen Weinreich, Monmouth Junction, N.J.

[73] Assignee: Inventures, Inc., Parsippany, N.J.

[21] Appl. No.: 109,714

[22] Filed: Aug. 20, 1993

Related U.S. Patent Documents

Reissue of:

[64] Patent No.: 5,041,044
Issued: Aug. 20, 1991
Appl. No.: 372,643
Filed: Jun. 28, 1989

[51] Int. Cl.[6] ..... A63H 33/26; A63H 33/22; A63J 3/00; A63J 5/00

[52] U.S. Cl. ..... 446/130; 446/219; 446/485; 472/58; 40/442

[58] Field of Search ..... 472/57, 58, 63, 472/71, 72; 446/129, 130, 131, 132, 133, 134, 135, 136, 137, 138, 84, 83, 82, 71, 72, 73, 75, 81, 219, 236, 246, 423, 481, 484, 485

[56] References Cited

U.S. PATENT DOCUMENTS

| | | | |
|---|---|---|---|
| 1,646,706 | 10/1927 | Polland | 472/58 X |
| 1,842,615 | 1/1932 | Barrer | 472/58 X |
| 1,996,457 | 4/1935 | Chandlee | 273/13 |
| 2,222,301 | 11/1940 | Rappaport | 472/63 X |
| 2,418,198 | 4/1947 | Shipman | 272/13 |
| 3,473,429 | 10/1969 | Tandberg | 272/8 M |
| 3,751,849 | 8/1973 | Goldfarb et al. | 446/246 |
| 3,765,120 | 10/1973 | Waak | 446/481 |
| 4,023,794 | 5/1977 | Adams | 272/8 M |
| 4,026,066 | 5/1977 | Reiner et al. | 472/71 X |
| 4,068,841 | 1/1978 | Kuna et al. | 472/72 X |
| 4,180,931 | 1/1980 | Osch | 272/8 M X |
| 4,294,445 | 10/1981 | Crosbie | 446/219 X |
| 5,310,377 | 5/1994 | Joja | 446/485 X |

FOREIGN PATENT DOCUMENTS

| | | | |
|---|---|---|---|
| 177358 | 1/1954 | Germany | 472/58 |

*Primary Examiner*—Robert A. Hafer
*Assistant Examiner*—D. Neal Muir
*Attorney, Agent, or Firm*—Sherman and Shalloway

[57] ABSTRACT

A figure placed into a first unit and watched through a transparent door is made to disappear and simultaneously to reappear in a remote second unit from which it may be removed. The first unit, also referred to as the sending unit, comprises a housing which includes a multi-chamber turntable which can contain one or more figures. A door in the first unit includes a half silvered mirror and an additional chamber so that a figure in a turntable chamber can be made to seem to dissolve and disappear. A second multi-chamber unit, also referred to as a receiving unit, substantially identical to the first, is connected to the first unit by wires. Selected chambers of the second unit are filled with figures substantially identical to the figures to be sent by the first unit. Initially, a first figure is placed into the first unit. The transparent door closes and locks and the figure seems to dissolve by the transfer of lighting to the additional chamber in the door. Simultaneously, an identical figure is made to appear in the second unit. After the dissolve process, the previously visible chamber of the first unit has indexed so as to place a vacant chamber in its previous location. The door of the first unit then opens and the vacant chamber inspected. The door of the second unit also opens and the figure removed for inspection. Encoding magnets in the figure being sent identify the figure to cause the multichambered turntable in the receiving unit to index to the correct chamber. In an alternative embodiment operated on similar principles, a pair of turntables in the same unit rotate in a coordinated manner to cause a figure to transmogrify into another figure. Simultaneous cross dissolves are also possible in the alternative embodiment.

19 Claims, 8 Drawing Sheets

TELEPORTER

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a teleporter illusion apparatus for making a figure seem to disappear from one unit and reappear in a second unit remote from the first unit.

2. Background of Related Art

For many years, magicians have incorporated into their acts, illusions in which an individual, animal, or object disappears from one location and reappears at another. Although the use of twins is known in the art, the disappearance and reappearance are done under wraps or behind curtains with a generally substantial delay between the initial covering (prior to revealing the disappearance) and the reappearance. The methods used are known to the magician and the equipment used cannot stand a fair, unsupervised inspection.

There are toys and mechanical illusions which produce disappearance and reappearance. Perhaps one of the most relevant devices is described in U.S. Pat. No. 4,026,066 entitled OPTICAL ILLUSION-PRODUCING ROTATING TOY. These devices, however, have been limited to disappearances and reappearances at the same location.

SUMMARY OF THE INVENTION

Briefly described, the invention comprises a pair of multi-chambered units in which a doll or "action figure" in the one accessible chamber of the first unit can be made to seem to disappear and reappear in the one accessible chamber of the second unit and vice versa. Each unit preferably comprises six chambers located on a turntable. A door is positioned in front of the chamber and provides a viewing port to permit apparently continuous viewing of the chamber. The door includes an additional chamber, also referred to as the illusion chamber, therein and a partially silvered mirror placed at 45° with respect to the illusion chamber and the accessible chamber visible in the multi-chamber unit. A light is located directly above the accessible chamber. An additional light is located above the illusion chamber in the door. By coordinating the relative brightness of both lights it is possible to make the action figure in the first unit seem to dissolve or disappear.

Each of several available action figure characters includes a unique encoded arrangement of magnets. Reed switches located behind the back panel of the accessible chamber will be opened or closed depending upon the encoding magnets in each of the action figures. Accordingly, each unit includes the ability to decode, i.e. identify, the unique action figure placed in each of its chambers. This information is transmitted to the receiving unit which indexes its turntable to bring the correct action figure character into accessible position based upon the decoded information sent from the sending unit.

A communication means, preferably wires, but possibly infrared or radio communication, is used to communitate between both units so that the position of the turntable in each unit can be appropriate for the illusion. An overcenter-lock mechanism on the door guarantees that the door will remain shut as the unit operates thereby hiding the method of operation.

In operation, the user places an action figure in the accessible chamber of the first unit through the doorway. The door then closes and locks and a change in lighting makes the action figure in the chamber seem to disappear while simultaneously an identical figure appears in the second unit.

According to an alternative embodiment, a single unit may include two multi-chambered turntables which permit an action figure to be transmogrified into another action figure in the same unit. Two transmogrifier units connected together have the capability of performing a simultaneous cross dissolve.

The invention has substantial play value because the method of operation is completely hidden from the user by means of the novel relationship between the turntable chambers, the illusion chamber and the duplicate action figures.

These and other features of the invention may be more fully understood by reference to the following drawings.

DETAILED DESCRIPTION OF THE PREFERRED EMBODIMENT

During the course of this description, like numbers will be used to identify like elements according to the different figures which illustrate the invention.

Figure 1:
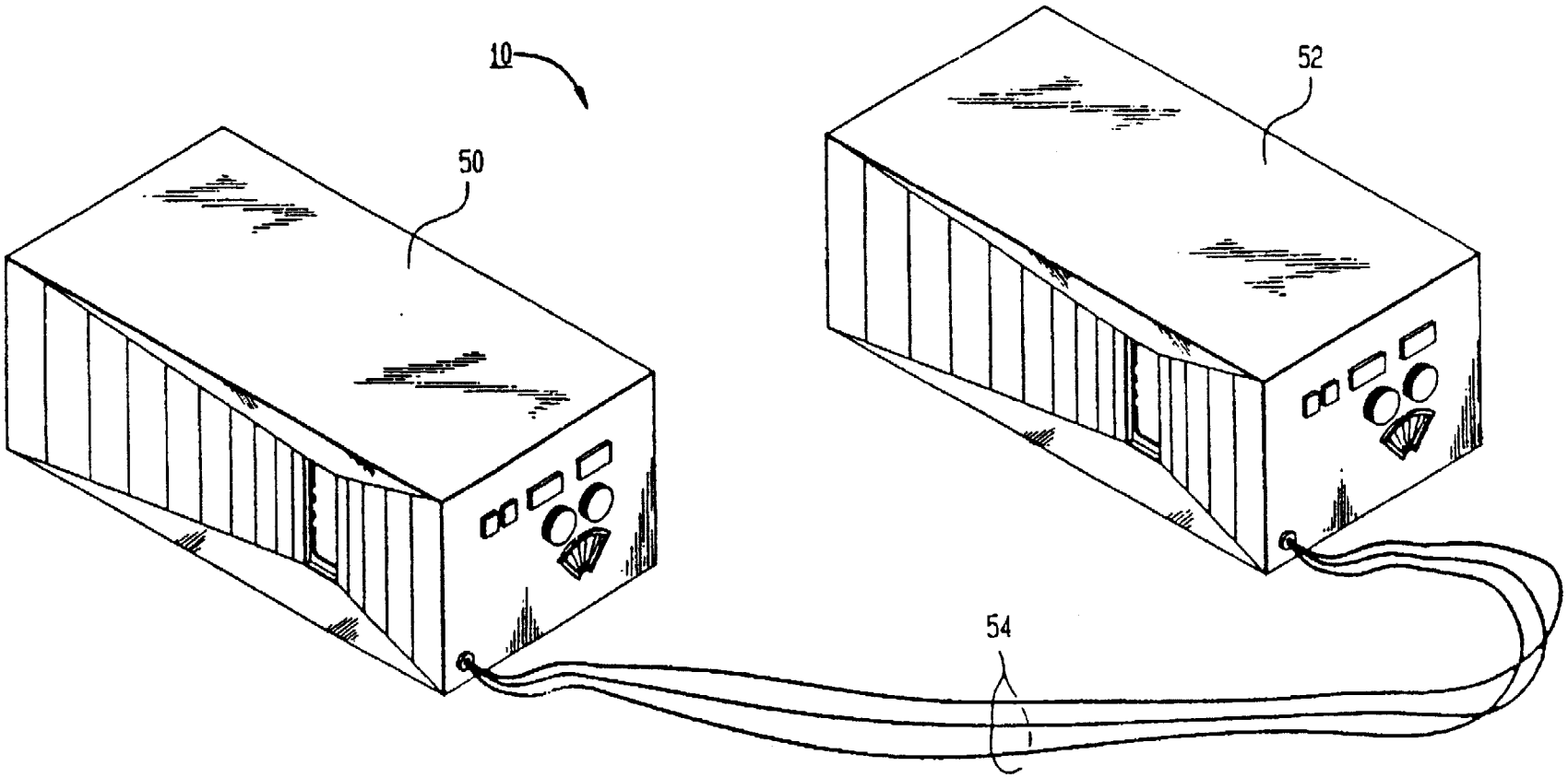
FIG. 1 illustrates a teleporter sending unit connected by wires to a substantially identical receiving teleporter unit according to the preferred embodiment of the invention.

As shown in FIG. 1, the invention 10 comprises a multi-chambered sending unit 50, a multi-chambered receiving unit 52 and a group of communications wires 54 connecting the sending unit 50 to the receiving unit 52. For all practical purposes, sending unit 50 is substantially identical to receiving unit 52. Sending unit 50 and receiving unit 52 each preferably include six storage chambers therein.

The details of the chambers and the associated mechanism are more fully understood by referring to FIGS. 2, 3, 4 and 5. Each of the six chambers 12 can store an action figure 28. Action figure 28 may be a doll or an action figure or similar item. In addition to the six storage chambers 12, there is also an illusion chamber 14 in door assembly 26. A clear plastic cover 16 protects illusion chamber 14 and the mirror 18. Half-silvered mirror 18 is located at a 45° angle with respect to the illusion chamber 14 and the storage chamber 12.

Figure 4:
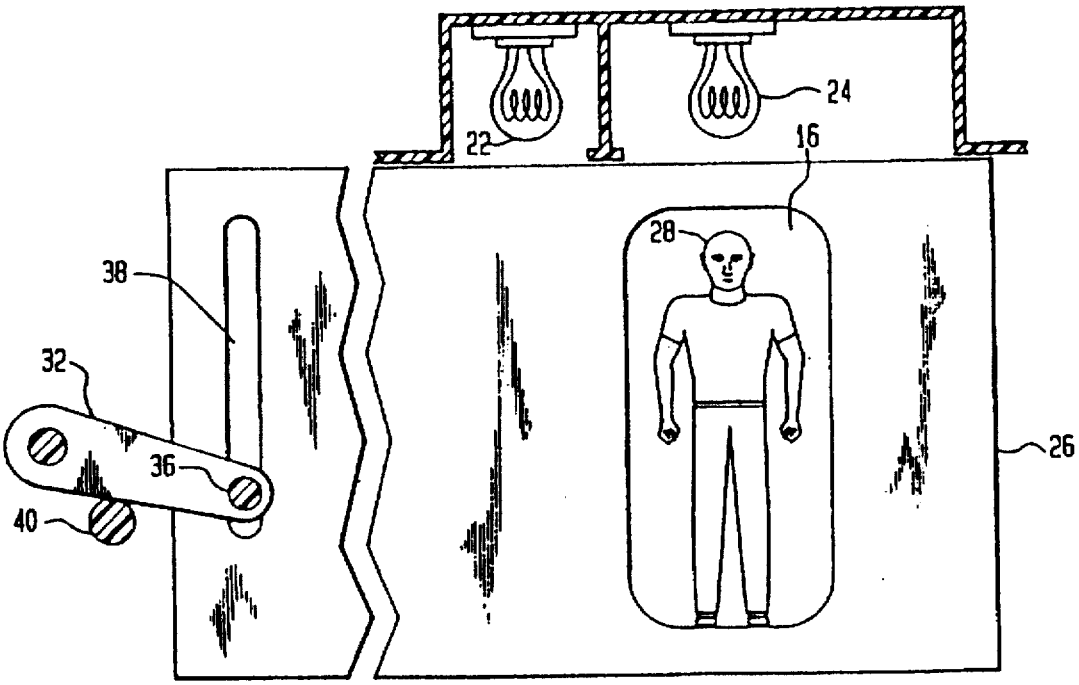
FIG. 4 is a front elevational view of the door and dissolve mechanism of the teleporter unit illustrated in FIGS. 2 and 3.

Storage chambers 12 are situated in a rotatable turntable 30. A viewing port shown in FIG. 4 is located in the door assembly 26. Light is provided for the illusion chamber 14 by a lamp 22. Similarly, light is provided for the accessible storage chamber 12 by another lamp 24. Lamps 22 and 24 are operated in such a fashion that when one gets brighter the other get dimmer and vice versa.

A sliding door 26 carries the illusion chamber 14, the clear plastic cover 16 and the half silvered mirror 18. Door 26 slides within housing 34. In the position shown in FIGS. 3 and 4, an action figure 28 is visible through the clear plastic cover 16, and the half silvered mirror 18.

Figure 2:
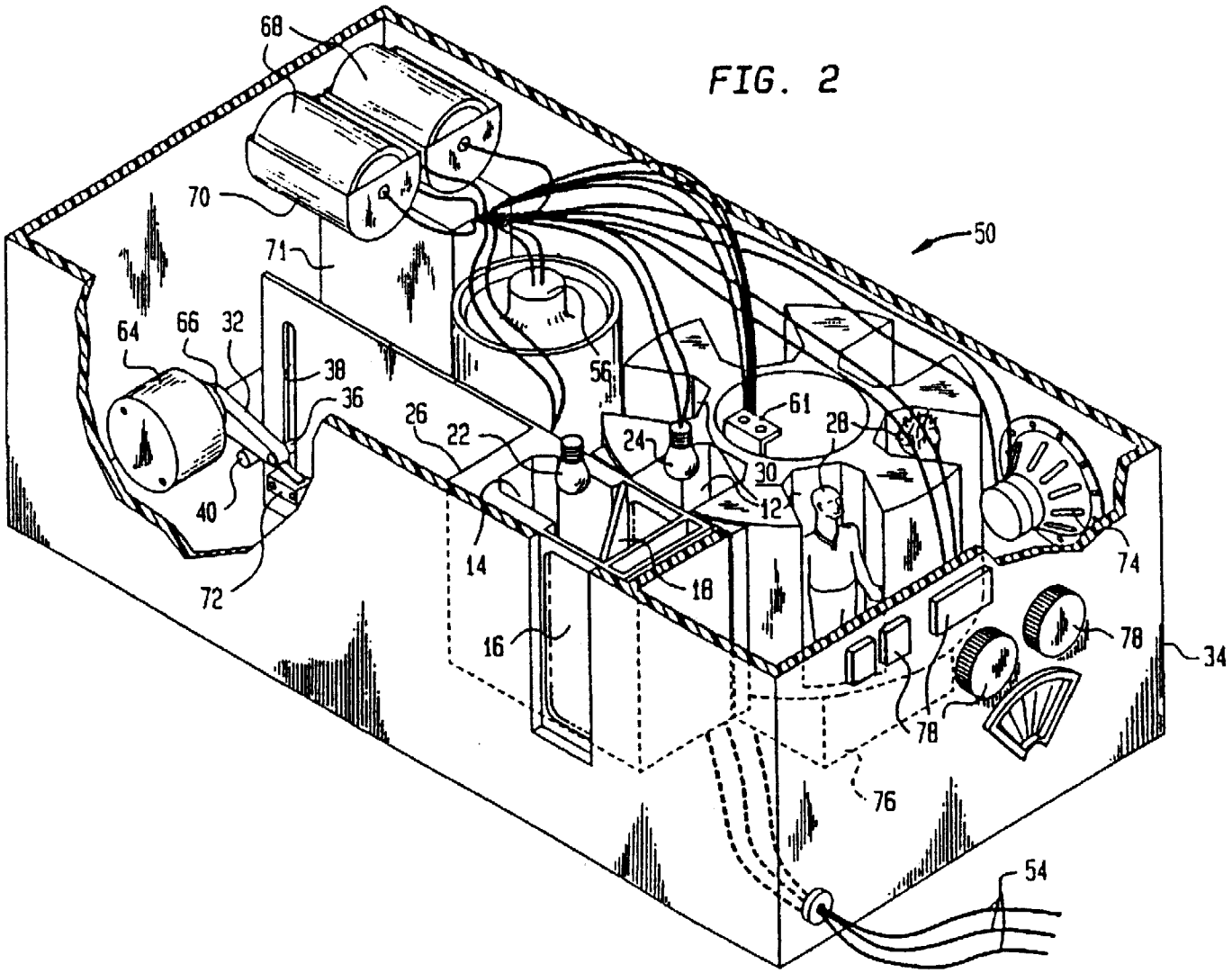
FIG. 2 is a perspective, partial cut-away view of the preferred embodiment of an individual teleporter unit.
Figure 3:
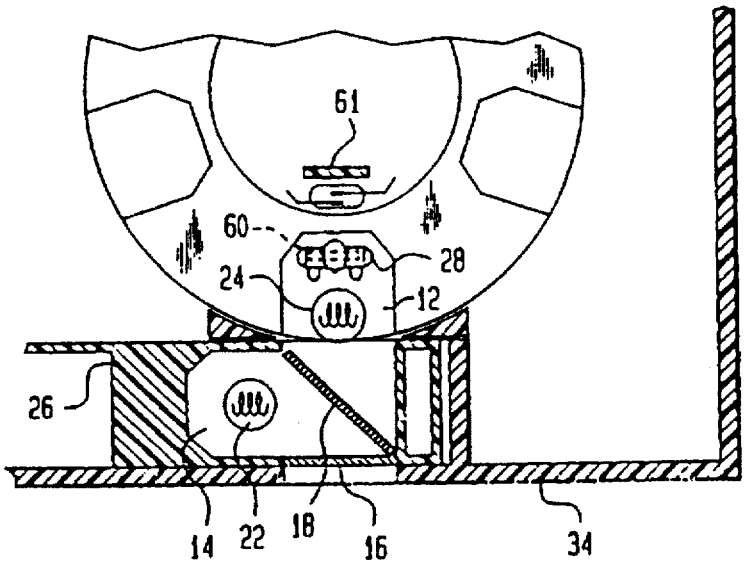
FIG. 3 is a cross-sectional, detail, top plan view of the door and dissolve mechanism of a teleporter unit.

According to the preferred embodiment of the invention 10, there are six storage chambers 12 carried on turntable 30. The turntable 30 is preferably driven by a conventional Geneva mechanism 76 indicated in FIG. 2 which can index any one of the six storage chambers 12 into position in front of the doorway. Geneva mechanism 76, indicated in FIG. 2, is located directly beneath the turntable 30 and is driven by motor 56. A suitable Geneva mechanism 76 is manufactured by PIC as Model No. EU-3 Intermittent Motion Assembly. Control box 71 controls the lights and sounds of unit 50, Geneva 76 and motor 56 and the communication with receiving unit 52.

Sliding door 26 is lockable in position by means closing arm 32. Closing arm 32 includes a pin 36 which 35 travels up and down a slot 38 in the frame of door 26. A stop 40 allows the closing arm 32 to act as a lock. In the position shown in FIG. 4, the closing arm 32 has gone over center, thereby effectively locking the door 26 in position. This prevents detection of the method of operation. Closing arm 32 is driven by motor 64 and slip clutch 66 such as manufactured by Berg Model No. J.C.-7. A limit switch 72, shown in FIG. 2, causes the closing arm 32 to stop when the door 26 is fully closed and locked.

Figure 5:
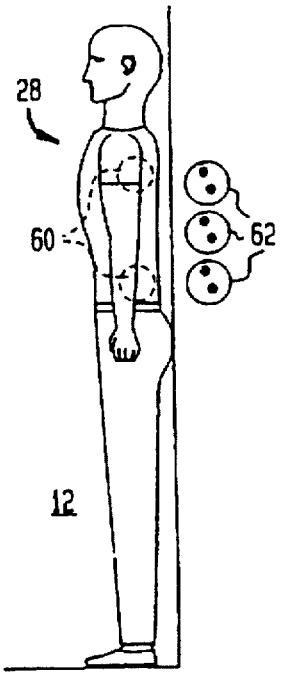
FIG. 5 is a side cross-sectional view of an action figure in a chamber of a teleporter unit illustrating the coding/decoding mechanism employed to identify specific action figures.

Each of preferably five possible action figures 28 includes a plurality of uniquely positioned magnets 60 such as shown in FIG. 5. Three reed switches 62, located behind the back panel of accessible chamber 12, are positioned to read the magnets 60 located in the back of each action figure 28. Since only five (5) action figures 28 are contemplated, it is not necessary to employ more than three magnets 60 to encode each action figure 28. The positions of the magnets 60 will cause one or more of the reed switches 62 to close. The pattern of 55 open or closure of reed switches 62 will uniquely identify the action figure 28 in the sending unit 50. This information is easily decoded. The decoder could be a microprocessor, relay switching circuit or other common device. Acceptable conventional decoding arrangements are well known to those of ordinary skill in the art and therefore will not be described in further detail. The information is transmitted over wires 54 to the receiving unit 52 which is instructed to index its own turntable 30 so as to present the proper corresponding action figure 28 to its own doorway.

In addition to the foregoing, each teleporter unit includes batteries 68 supported by standard battery holders 70 which provide power to the sending unit 50 or receiving unit 52. Alternatively, the teleporter units 10 could be supplied by power from a standard AC source which is stepped down and rectified for use with the motors and electronic parts of each unit 10. Each teleporter unit 10 is also preferably supplied with a speaker 74 which provides sound effects to enhance the illusion and to cover mechanical sounds thus disguising the method of operation. Controls and readout windows 78 are preferably located on the side of each unit 10 and simulate control of the teleportation process.

Figure 6:
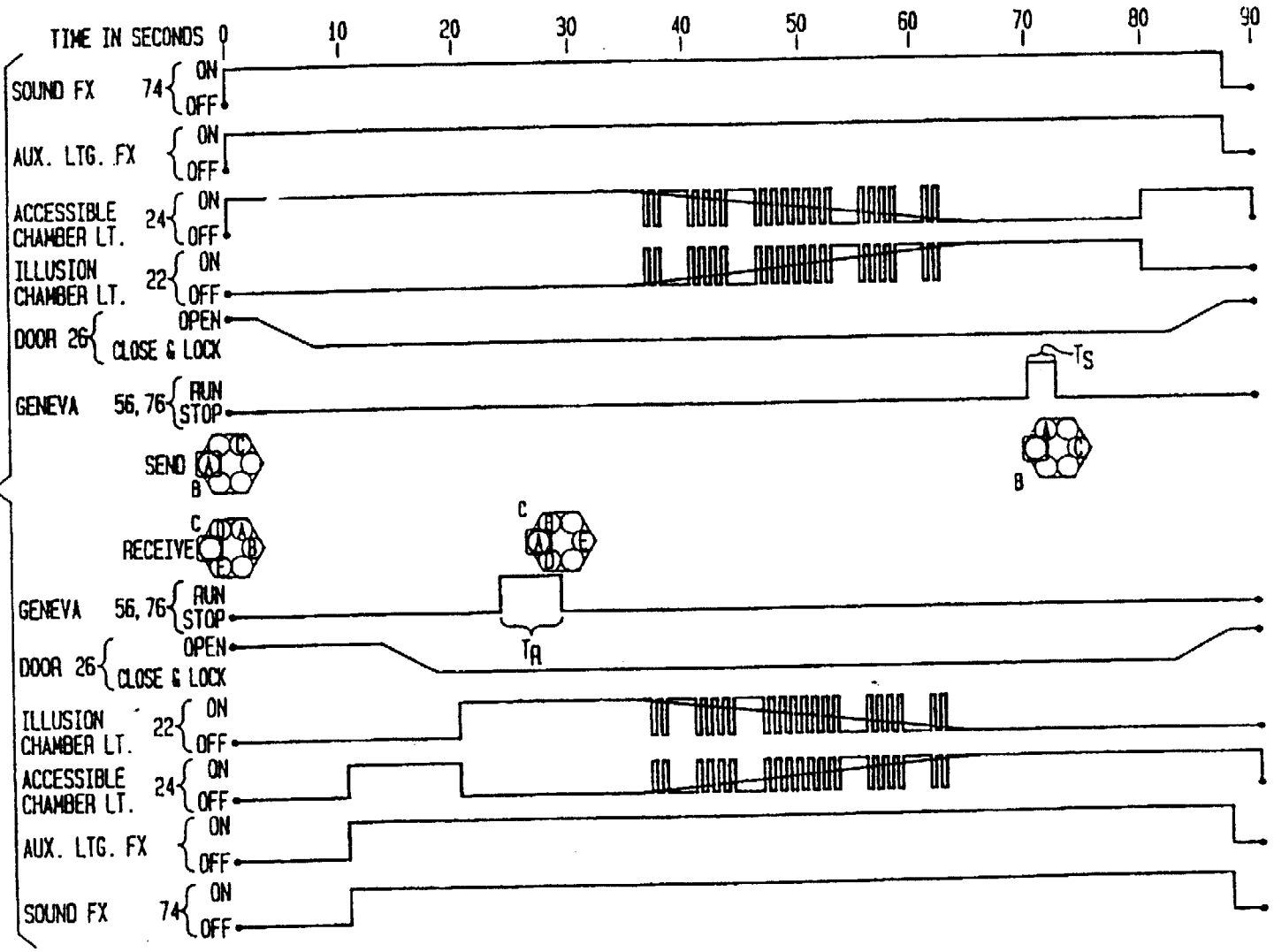
FIG. 6 is a timing diagram of the sending and receiving teleporter units illustrating the manner in which they synchronize their relative functions.

The operation of the invention can be understood by referring to the timing diagrams of the sender unit 50 and the receiving unit 52 as shown in FIG. 6.

Initially, a doll or action figure 28 (figure type A) is placed into the accessible chamber 12 of the sending unit 50 and the teleport sequence is engaged.

Next, the power is turned on to the unit 50 lighting the accessibie chamber 12 by means of lamp 24.

The doors 26 of units 50 and 52 are closed and locked by means of the mechanism including the closing arms 32.

Illumination is transferred from the accessible compartment 12 to the illusion compartment 14 of the receiving unit 52. Sound effects have been initiated at this stage.

The action figure 28 (type A) in the accessible compartment 12 of sending unit 50 is identified by its unique set of magnets 60 and the receiving unit 52's turntable 30 rotates to bring a compartment 12 with a previously stored twin character doll 28 (type A) into the accessible position during time period $T_R$.

Either in a dissolve (cross fade) or as alternately flashing lights (or by moving a variable silvered mirror or by moving a shutter) illumination is transferred simultaneously from the accessible compartment 12 to the extra compartment 14 of the sending unit 50 and from the extra compartment 14 to the accessible compartment 12 of the receiving unit 52. The cross fade can be accomplished either by a simultaneous diminish and increase of the lights or by flashing of the lights as shown superimposed in FIG. 6.

The turntable 30 of sending unit 50 turns to place a vacant compartment 12 in accessible position (preferably as lighting and sound effects continue) during time period $T_s$.

Illumination is then transferred from the extra compartment 14 to the new accessible compartment 12 of the sending unit 50.

Sound and lighting effects then cease.

Twin action figure 28 (type A) is now in the accessible chamber 12 of receiving unit 52 and a vacant chamber 12 is now accessible in sending unit 50. The chamber doors 26 of both sending and receiving units 50 and 52, respectively, are released and opened.

It is understood that the foregoing sequence can be reversed so as to return the figure 28 (type A) back to its original sending unit 50 from the receiving unit 52. Figure type designations adjacent to the turntable diagrams in FIG. 6 are those available to teleport. The stored figure types which have no twins are yet to be purchased by the user. Prior to such purchase, the user has no access to nor knowledge of those stored figures.

The operation of the invention 10 is preferably battery powered and controlled by a microprocessor which includes appropriate status checks to determine if the doors close, the battery is charged and that the filaments of lamps 22 and 24 are intact. Incorrect status or "unauthorized personnel" (figures not manufactured for use in the system) may disable the system 10 and initialize trouble readouts. Attempting to teleport the same character 28 twice from the same chamber may also disable the system 10.

The preferred embodiment of the invention describes the use of a half silvered mirror and alternately lit compartments to provide the dissolve and reappearance effect. Alternatively, disappearance and appearance could be performed by black-art techniques commonly used in stage magic. Character transport could also be achieved through the use of a single chamber with a magazine of action figures under the floor of the teleporter unit.

Communications between the sending unit 50 and the receiving unit 52 are preferably done by wire 54. However, other communication modes are possibie including but not limited to infrared, radio, visible light, or even sound.

It is also expected that the system 10 may be enhanced by sound effects that are keyed into the illusion.

A motor 56 and Geneva 76 indicated in FIG. 2 is preferably employed to drive the rotating turntable platform 30. Other common indexing devices may also be used.

The encoding mechanism shown in FIG. 5 preferably comprises three reed switches 62 behind the back wall of the chamber 12 which are activated by a magnet or magnets 60 on the back of action figures 28. Other encoding devices are possible including, but not limited to, optical readers and bar code-like strips.

Control of the sequencing can be accomplished with a Prom 16 controller manufactured by Bayside Controls, 173 Ludlow Avenue, Northvale, N.J. 07647. Bayside Controls also manufactures a control to cross fade a pair of lamps. This control can be joined with the Prom 16 if cross fade rather than alternate lamp flashing is desired. Both controllers are manufactured for 110 volt operation, but the operating methods are of course not dependent on the power source. Ozen Sound Devices, Inc., 225 Broadway, New York, N.Y. 10037 manufactures an endless loop tape player model TP-2 suitable to provide a sound track for the disclosed invention. Basically, the control of this system produces a simple sequence of electrical events (i.e. lights and motors) over time. The sequence can be interrupted if, for example, the door 26 fails to close. In order to provide for the simplest search procedure (for specific figures 28), the preferred embodiment includes a single set of reed switches 62 which are supported and wired within the turntable volume on a stationary bracket 61. Thus, there are no wires or commutators to the turntable 30 and the Geneva motor 56 can be non-reversible. At times indicated on the diagram in FIG. 6, the Geneva cam is driven six revolutions or fewer to the target figure 18. If the target figure 28 is not found, the program defaults to an error message, the doors 26 open and the program is terminated.

The transparent plastic sheet 16 is installed across the front face of the door 26 to protect the half silvered mirror 18 and also to prevent tampering and to aid in disguising the method of the illusion.

Variations of the preferred embodiment 10 include the possibility of storing some action figure characters 28 in each of the chambers 12, or storing multiple duplicates of the same character 28 (for expanded possibilities such as multiple transfers of the same character in the same direction), or the storing of distortions of figure 28 or merged characters (for appropriate scenarios). One of the advantages of the teleporter units 50 and 52 is that different action figures 28 can be purchased and used in the system 10. The teleporter units 50 and 52 are preferably manufactured with five different character action dolls 28 in five of the combined ten hidden turntable chambers 12 and these five character action figures 28 preferably constitute the entire product line for the life of the product. This allows new action charactor figures 28 to be released for sale from time to time without requiring the purchase of new units.

The effect can be further supplemented by the use of chaser lights within transparent sleeves on the connecting communication wires 54. These can be actual bulbs or light emitting diodes (LED's) or can be the ends of optical fibers illuminated from either end of the assembly. The optical fibers' color changes and chasing programs can be sequenced by color wheels using well known fiber optic display technologies. The play value of the invention 10 can be further enhanced by incorporating units into adventure scenarios of various places and times. For example, the scene might comprise a cave in a jungle setting or a phone booth in a cityscape. Alternate geometries for storing figures might be used in different set pieces so the configuration of the scenery is not overly constrained by the preferred unit construction.

Another play value enhancement might be the providing of a certain element of unpredictability or randomness in destinations. For example, using more than 2 units, 80% of the teleports from a given unit 50 might lead to the same receiving unit 52 but 20% might instead lead to another receiving unit 52.

An alternative embodiment of the invention is illustrated in FIGS. 7–10. The alternative embodiment comprises a sending transmogrifier unit 80 connected to a receiving transmogrifier unit 82 connected by wires 84. Transmogrifier units 80 and 82 are substantially identical in structure. A transmogrifier is a device which transmogrifies, i.e. changes, one figure into another in the same device. In other words, an action figure in a single transmogrifer unit 80 or 82 will appear to dissolve and become a second figure within the same unit. This is in contrast to the teleporter units 50 and 52 in which a figure is typically made to disappear.

Figure 8:
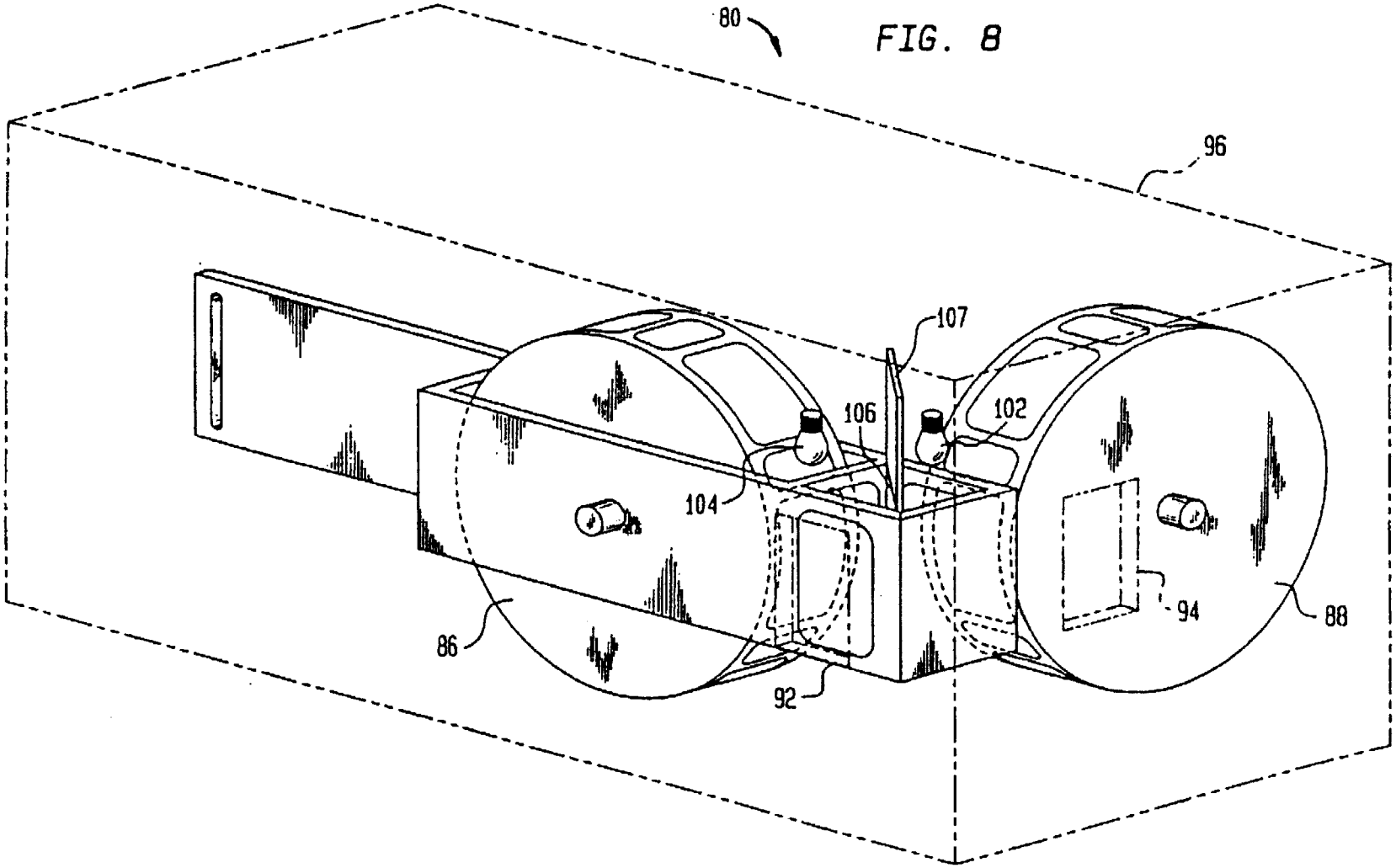
FIG. 8 is a perspective, partial cut-away view of an individual transmogrifier unit.
Figure 9:
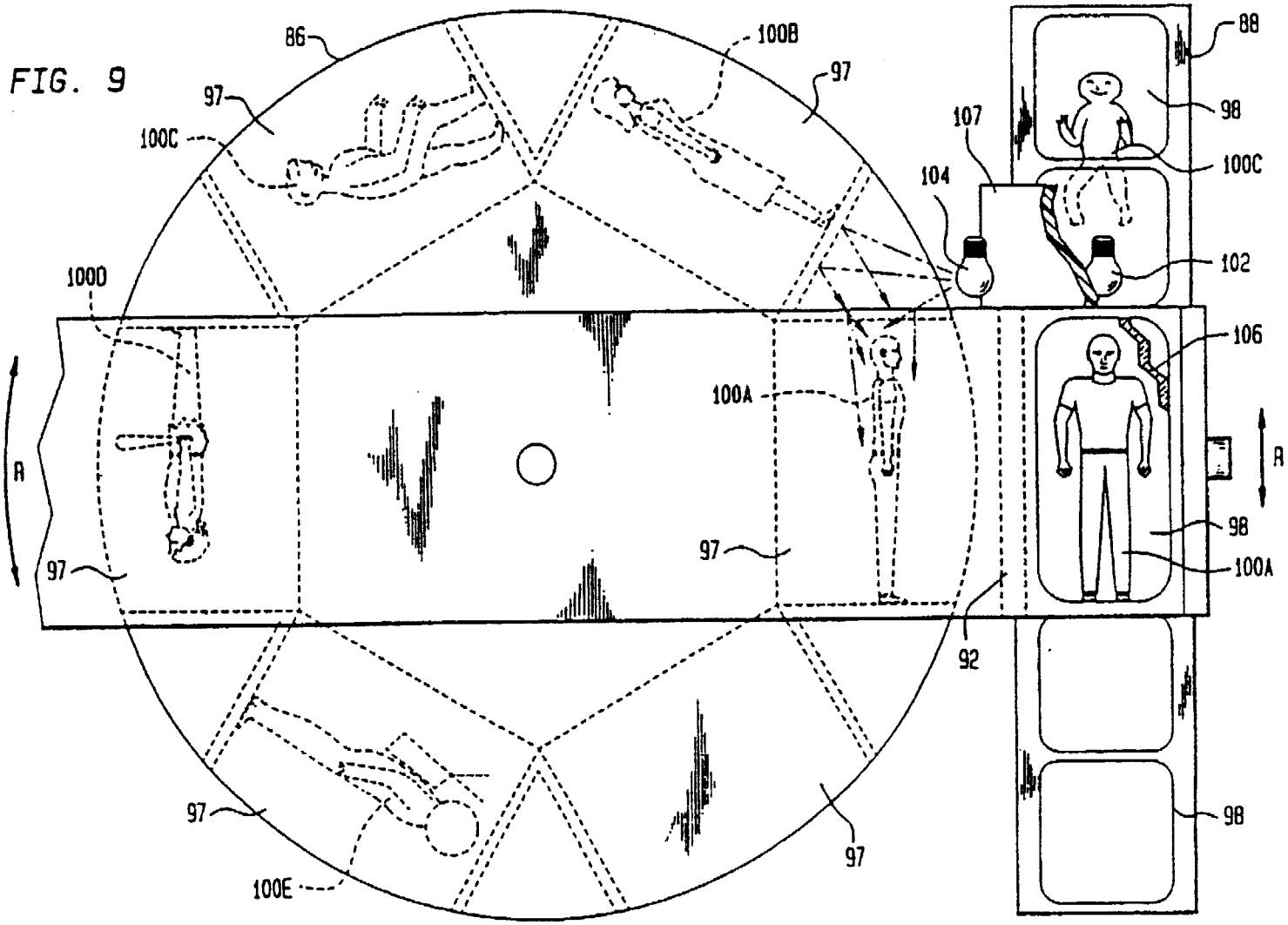
FIG. 9 is an elevational, detail view of the two perpendicular, multi-chamber, turntable portions of an individual transmogrifier unit.

FIG. 8 is a partial perspective cut-away view of a sending transmogrifer unit 80. Each transmogrifier unit includes a pair of multi-chambered turntables 86 and 88 which are at right angles to each other. Multi-chambered turntable 86 is carried with sliding front door assembly 92 positioned at the front of unit 80. The chambers in turntable 86 are never accessible and they replace the illusion chamber 14 in teleporter units 50 and 52. As shown in FIG. 9, action figures 100A–100E may be located in the compartments 98 in the first multi-chambered turntable 88, corresponding action figures 100A–100E are located in the chambers 97 of the second turntable 86. One chamber 97 and 98 in each of turntables 86 and 88 respectively is preferably always left vacant.

The front sliding door assembly 92 is lighted by a light 104 which reflects into the top of the chambers 97 in turntable 86. Similarly another light 102 is located for the chambers 98 in turntable 88. A half-silvered mirror 106 is located in the front sliding door assembly 92 and serves the same purpose as the mirror 18 in the door of the teleporter units 50 and 52. A baffle 107 separates the lights.

In view of the foregoing it is clear that the basic invention may comprise either a teleporter 50 or 52 or a transmogrifier 80 or 82.

In the transmogrifier mode, the extra chamber is not always empty, but can be automatically filled with any one several prestored figures 100A–100E. An illusion chamber 97 of turntable 86 may be viewed during changes, but is physically inaccessible to the user.

During operation, an action [figures] *figure* 100A–100E is placed into the accessible compartment 98 in turntable 88. Light 102 then turns on and the front door 92 closes. A nonduplicate figure to the one inserted into compartment 98 is brought into viewing position of turntable The light 102 over compartment 98 is then dimmed and the light 104 over compartment 97 is then turned on so as to cause the figure 100 in chamber 98 to transmogrify into a different figure 100 in the chamber 97 of turntable 86.

While the user is viewing the nonduplicate, the original figure 100 is replaced by a duplicate of the figure now in chamber 97. The lighting is then reversed. Finally the front door 92 opens so that the new action figure may be removed.

According to an alternative embodiment of the transmogrifier unit 80 the door assembly 92 is stationary and not slidable and action figures 100 are placed in turntable 88 through nontransparent side door 94.

Alternatively, if desired, it is possible to alternate between a series of action figures so as to produce a progressive change.

Figure 7:
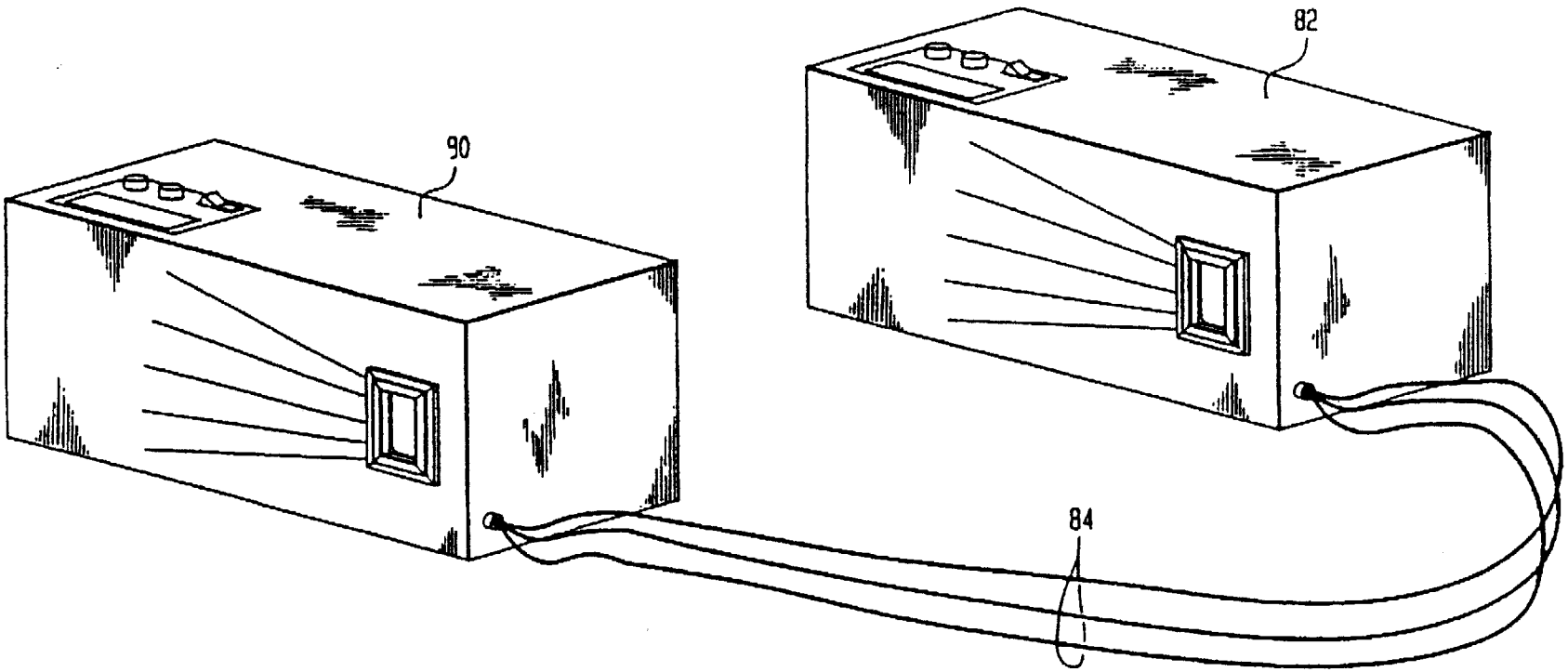
FIG. 7 is an alternative embodiment of the invention illustrating a sending transmogrifier unit connected by wires to a substantially identical receiving transmogrifier unit.

The transmogrification process can take place in a single unit. However, to enhance the play value of the invention it is possible to connect a sending transmogrifier 80 to a receiving transmogrifier 82 via wires 84, as shown in FIG. 7. In this variation, a first action figure in the sending unit 80 may teleport to receiving unit 82 while simultaneously the reverse is happening as the receiving unit 82 teleports a second action figure to the sending unit 80.

Figure 10:
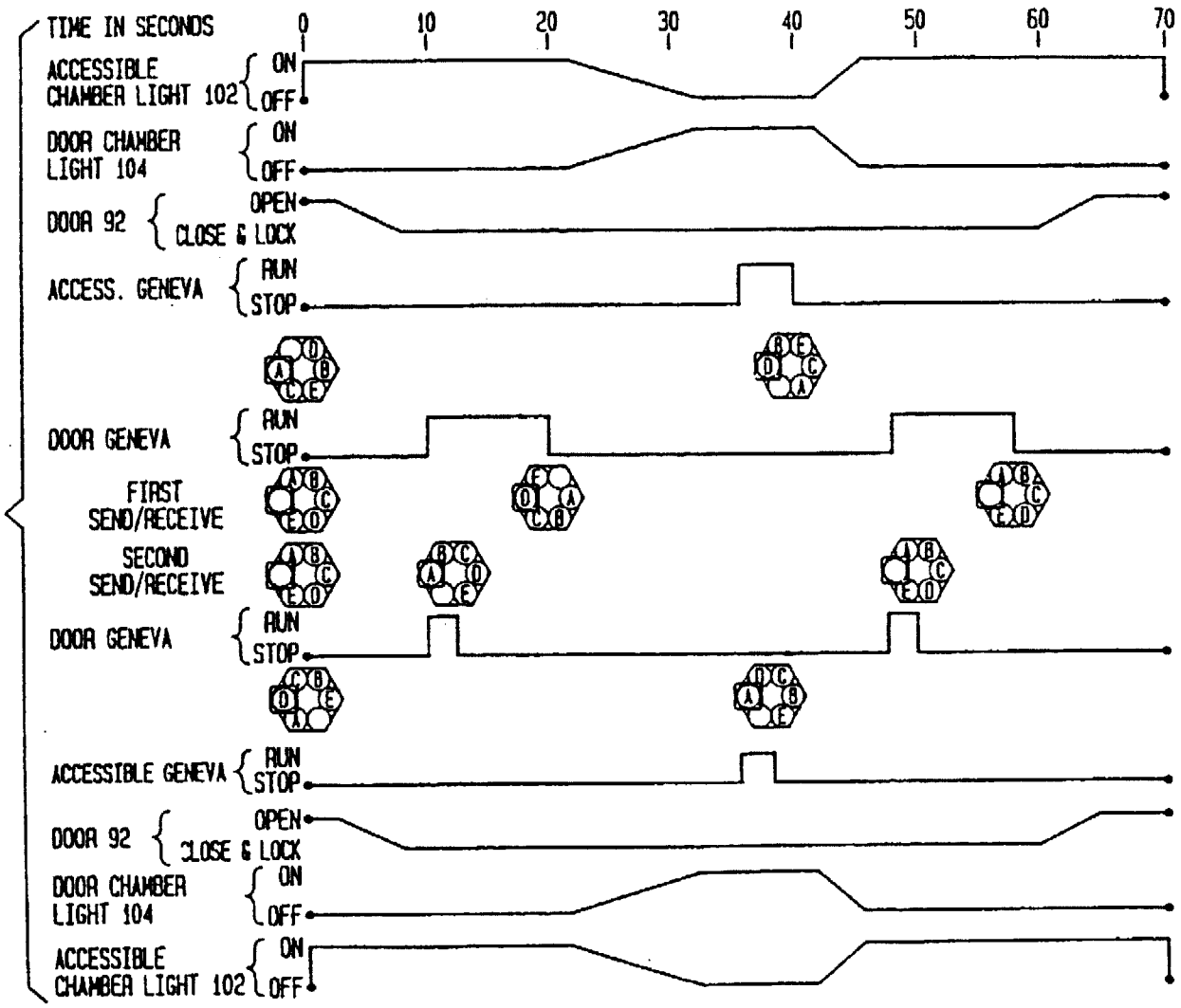
FIG. 10 is a timing diagram illustrating the manner in which a pair of sending and receiving transmogrifier units coordinate their activities.

FIG. 10 illustrates the manner in which the sending transmogrifier 80 interacts with receiving transmogrifier 82.

One of the major advantages of both embodiments of this invention is that the existence of nonaccessible chambers, the illusion chamber, and the duplicate action figures is completely hidden from the user.

While the invention has been described with reference to the preferred embodiment thereof, it will be appreciated by those of ordinary skill in the art that various modifications can be made to the structure and operation of the invention without departing from the spirit and scope of the invention as a whole.

I claim:

[1. A teleporter toy apparatus for making a figure seem to disappear comprising:

a first multi-chamber means having at least a first and a second figure-receiving chamber mounted on a first turntable;

a first door means located adjacent to said first multi-chamber means for viewing one of said chambers of said first multi-chamber means at a time;

a first dissolve means located in said first door means for making a figure in said first chamber seem to disappear; and, a first turntable driving means for positioning said second chamber behind said first door means after said first dissolve means has made the figure in said first chamber seem to disappear.]

2. [The] *A teleporter toy* apparatus [of claim 1 further] *for making a figure seem to disappear* comprising:

*a first multi-chamber means having at least a first and a second figure-receiving chamber mounted on a first turntable;*

*a first door means located adjacent to said first multi-chamber means for viewing one of said chambers of said first multi-chamber means at a time;*

*a first dissolve means located in said first door means for making a figure in said first chamber seem to disappear;*

*a first turntable driving means for positioning said second chamber behind said first door means after said first dissolve means has made the figure in said first chamber seem to disappear;* a second multi-chamber means having at least a first and a second figure-receiving chamber therein mounted on a second turntable;

a second door means located adjacent said second multi-chamber means for viewing one of said chambers of said second multi-chamber means at a time;

a second dissolve means located in said second door means for making a figure in one of said chambers of said second multi-chamber means seem to appear;

a second turntable driving means for driving the chambers of said second multi-chamber means past said second door means; and, communication means for coordinating the rotation of said first and second turntable driving means.

3. The apparatus of claim 2 wherein said first and second dissolve means comprise:

a nonaccessible additional compartment located respectively within said first and second door means;

partially silvered mirror means located at an angle with respect to said additional compartment and the chambers of said first and second multi-chamber means adjacent said first and second door means; and, additional chamber illumination means located within said first and second door means for controlling the illumination of said additional chamber with respect to the chambers of said first and second multi-chamber means adjacent said first and second door means, wherein said dissolve means makes a figure in one of the chambers seem to disappear by making the additional chamber more visible to a viewer.

4. The apparatus of claim 3 further comprising:

locking means for locking said first and second door means.

5. The apparatus of claim 4 further comprising:

encoding means connected to said communication means and attached to said first and second turntables for coordinating rotation of the turntables of said first and second multi-chamber means respectively.

6. The apparatus of claim 5 further comprising:

turntable chamber illuminating means for illuminating the chamber directly adjacent said first and second door means.

7. The apparatus of claim 6 wherein said partially silvered mirror of said dissolve means is located at an angle of substantially 45° with respect to said additional chamber and said chamber on said turntable directly adjacent said door means.

[8. The apparatus of claim 1 further comprising:

a second turntable having at least a first and a second figure-receiving chamber therein, said second turntable located adjacent said first turntable and oriented at an angle of approximately 90° thereto;

a second turntable driving means for driving said second turntable; and, a partially silvered mirror means located in said first door means and positioned at an angle with respect to said chambers in said first and said second turntables, wherein said first dissolve means causes an action figure in a chamber of said first turntable appear to transmogrify into an action figure in said second turntable.]

9. The apparatus of claim 1 further comprising:

sound means for making a sound to disguise the noise made by said apparatus.

[10. The apparatus of claim 1 wherein said first turntable driving means comprises:

a motor; and, a Geneva-type drive means attached to said motor.]

11. The apparatus of claim 2 further comprising at least a first original figure and a first duplicate figure substantially [identical to] *similar* said first original figure, wherein said first duplicate figure is prestored in said second multi-chamber means and accessible only through the introduction of said first original figure in said first multi-chamber means.

12. The apparatus of claim 5 wherein said encoding means includes:

a plurality of magnets in at least one figure; and, magnet sensitive switch means mounted on said apparatus adjacent said turntable for activation by said magnets as said figures pass by said magnet sensitive switch means.

[13. A teleporter apparatus comprising:

a first multi-chamber means having at least a first and a second figure receiving chamber therein located on a turntable;

first door means located adjacent said first multi-chamber means for viewing at least one of said chambers of said first multi-chamber means;

second multi-chamber means having at least a first and a second figure-receiving chamber therein located on a turntable;

second door means located adjacent said second multi-chamber means for viewing at least one of said chambers of said second multi-chamber means; and, communication means for making a figure in one of the chambers of said first multi-chamber means appear to disappear from said first multi-chamber means and reappear in one of said chambers of said second multi-chamber means.]

[14. An apparatus for making a figure disappear comprising:

a first turntable having at least a first and a second figure-receiving chamber located therein;

a first turntable driving means;

a second turntable having at least a first and a second figure-receiving chamber located therein, said second turntable being located adjacent to said first turntable and oriented at approximately 90° with respect thereto;

a second turntable driving means for driving said second turntable;

a door means located adjacent to said first and second turntables for viewing at least one of the chambers in said first and second turntables; and, a dissolve means located in said door means for making a figure in a chamber in said first turntable appear to transmogrify into a figure in a chamber in said second turntable.]

[15. The apparatus of claim 10 wherein said dissolve means includes:

first illumination means for illuminating a chamber in said first turntable;

second illumination means for illuminating a chamber in said second turntable; and, a partially silvered mirror means mounted in said door means and located at an angle with respect to said chambers of said first and second turntables.]

16. The apparatus of claim 11 further comprising:

communication means for connecting said apparatus to at least a second substantially similar apparatus, wherein an action figure *seemingly* transmogrified in one apparatus will appear in said second apparatus and vice versa.

17. A method for making a figure disappear and reappear comprising the steps of:

placing a figure in one chamber of a first multi-chamber means such that said figure is viewable through a door;

making said figure appear to disappear to an empty chamber;

rotating said chamber with said figure away from said door;

transmitting information from said first multi-chamber means to a second multi-chamber means including a plurality of chambers at least one of which includes a figure substantially identical to the figure initially seen in said first multi-chamber means; and, making said substantially identical figure appear to reappear through a door in said second multi-chamber means.

[18. A method for making a first figure transmogrify into a second figure comprising the steps of:

placing said first figure in one chamber of a first multi-chamber turntable such that said first figure is visible through a door;

illuminating said visible chamber of said first turntable;

illuminating a chamber of a second multi-chamber turntable located adjacent to said first turntable;

a rotating said first turntable so as to present a different chamber; and, making said second located in said second turntable appear visible through said door, wherein said first figure appears to transmogrify into said second figure.]

19. A teleporter *simulation* apparatus comprising:

first multi-chamber means having at least a first and a second chamber for receiving [figures] *objects* therein;

second multi-chamber means having at least a first and a second chamber containing further [figures] *objects* therein;

automatic identifying means for determining the identity of said [figures] *objects* in said first multi-chamber means; and electronic communication means for communicating the identity of [a figure] *an object* in one of the chambers of said first multi-chamber means to said second multi-chamber means and for coordinating the disappearance of one of said [figures] *objects* from one of the chambers of said first multi-chamber means and the appearance of said further [figures] *objects* in one of said chambers of said second multi-chamber means.

20. The apparatus of claim 19 further comprising:

first [door] *viewing* means located adjacent said first multi-chamber means for viewing at least one of said chambers of said first multi-chamber means; and, second [door] *viewing* means located adjacent said second multi-chamber means for viewing at least one of said chambers of said second multi-chamber means.

21. A method for making a figure disappear and reappear comprising the steps of:

placing a figure in one chamber of a first multi-chamber means such that said figure is viewable;

automatically determining the identity of said figure;

making said figure seem to disappear;

electronically transmitting information comprising information about the identity of said figure from said first multi-chamber means to a second multi-chamber means including a plurality of chambers at least one of which includes a figure substantially identical to the figure initially seen in said first multi-chamber means; and, making said substantially identical figure seem to appear in said second multi-chamber means.

[22. A method for making a figure transmogrify into another figure comprising the steps of:

placing a first figure in one chamber of a first multi-chamber turntable such that said first figure is visible through a door;

illuminating said one chamber of said first turntable;

illuminating a chamber of a second multi-chamber turntable located adjacent to said first turntable;

rotating said first turntable so as to present a different chamber; and, making a second figure located in said turntable appear visible through said door, wherein said first figure appears to transmogrify into said second figure.]

[23. A method for making a figure transmogrify into another figure comprising the steps of:

placing a first figure in a first chamber of a first mutli-chamber means such, that said first figure remains visible after placement in said chamber, wherein said first multi-chamber means contains a second figure in a second chamber of said first multi-chamber means, and further wherein said second figure is similar to said first figure;

presenting a substantially similar third figure located in a chamber of a second multi-chamber means located adjacent said first multi-chamber means, to a visual dissolve means dissolving the image of said first figure such that a viewer sees the third figure through said visual dissolve means;

activating said first multi-chamber means so as to present said second figure to said dissolve means;

cross dissolving the image of said third figure into said second figure so that said second figure located in said first multi-chamber means is visible to the viewer; and, removing said second figure from said first multi-chamber means.]

24. A teleporter apparatus for making an object seem to disappear from one location and appear at another location comprising:

a first unit and at least one substantially similar other unit capable of causing objects to seem to disappear and appear;

automatic identifying means for determining the identity of said objects; and, electronic communication means for communicating the identity of said objects from said first unit to said other unit and for coordinating the disappearance of said objects from said first unit with the appearance of a similar object at at least one of said other units.

25. The apparatus of claim 24 further comprising:

selecting means for selecting one of several objects stored in at least one of said other units in which an object appears and causing to appear.

26. The apparatus of claim 24 further comprising:

viewing means incorporated into said first unit and said other units for permitting an observer to watch an object as it seems to disappear and appear.

27. The apparatus of claim 24 further comprising door means for permitting the insertion of objects to be disappeared into said first unit and for permitting the removal of objects that have appeared from said other unit.

28. A teleporter *simulation* apparatus comprising:

a first multi-object storage means for storing a plurality of objects having at least a first and a second [figure] *object* storage location therein;

automatic identifying means for determining the identity of said objects;

a second multi-object storage means having at least a first and a second [figure] *object* storage location therein; and, electronic communication means for communicating the identity of [a figure] *an object* in one of the storage locations of said first multi-object storage means to said second multi-object storage means and for making [a figure] *an object* in one of the storage locations of said first multi-object storage means seem to disappear from said first multi-object storage means and reappear at one of the locations of said second multi-object storage means.

* * * * *